United States Patent
Kim

(10) Patent No.: US 7,554,581 B2
(45) Date of Patent: Jun. 30, 2009

(54) METHOD OF CONTROLLING A CAMERA FOR USERS HAVING IMPAIRED VISION

(75) Inventor: Dong-min Kim, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 653 days.

(21) Appl. No.: 10/694,491

(22) Filed: Oct. 27, 2003

(65) Prior Publication Data

US 2004/0085471 A1    May 6, 2004

(30) Foreign Application Priority Data

Oct. 29, 2002    (KR) ............... 10-2002-0066123

(51) Int. Cl.
*H04N 5/222* (2006.01)
*H04N 5/262* (2006.01)

(52) U.S. Cl. .................. 348/239; 348/333.05

(58) Field of Classification Search ............ 348/62, 348/63, 240.2, 239, 333.02, 333.11, 333.05, 348/333.01, 333.12; 715/865, 810–836; 345/672, 650, 646, 647, 660, 671
See application file for complete search history.

(56) References Cited

U.S. PATENT DOCUMENTS

| | | | | |
|---|---|---|---|---|
| 5,880,733 A * | 3/1999 | Horvitz et al. | ............... | 715/850 |
| 5,973,694 A * | 10/1999 | Steele et al. | ............... | 715/835 |
| 6,256,027 B1 | 7/2001 | Jeong et al. | | |
| 6,384,840 B1 * | 5/2002 | Frank et al. | ............... | 345/634 |
| 6,466,237 B1 * | 10/2002 | Miyao et al. | ............... | 715/838 |
| 6,473,523 B1 * | 10/2002 | Newman et al. | ............ | 382/176 |
| 6,774,788 B1 * | 8/2004 | Balfe | ................. | 340/539.13 |
| 7,051,291 B2 * | 5/2006 | Sciammarella et al. | ...... | 715/838 |
| 2001/0056342 A1 * | 12/2001 | Piehn et al. | ................. | 704/3 |
| 2002/0063783 A1 * | 5/2002 | Kurase | .................... | 348/232 |
| 2004/0201716 A1 * | 10/2004 | Sakaegi | ................. | 348/220.1 |
| 2004/0201767 A1 * | 10/2004 | Niikawa et al. | ........ | 348/333.03 |

FOREIGN PATENT DOCUMENTS

| | | | |
|---|---|---|---|
| EP | 1246434 A1 * | 10/2002 | |
| JP | 10042250 A * | 2/1998 | |
| JP | 11-196297 A | 7/1999 | |
| JP | 2001067163 A * | 3/2001 | |
| JP | 2002-281353 A | 9/2002 | |

OTHER PUBLICATIONS

Machine English Translation of JP 11-196297 A.*
Machine English Translation of JP 10-042250 A.*

* cited by examiner

*Primary Examiner*—Lin Ye
*Assistant Examiner*—Nelson D. Hernández Hernández
(74) *Attorney, Agent, or Firm*—Drinker Biddle & Reath LLP

(57) ABSTRACT

A camera method in which, when a photographing mode is set by the operation of a user, photographing control is performed according to the operation of the user and, when a menu mode is set by the operation of the user, setting control for setting operation conditions of the camera is performed according to the operation of the user, wherein, when a mode for persons with impaired vision is set by the operation of the user, an OSD menu selected by the user is magnified and displayed in the photographing control and setting control steps.

18 Claims, 12 Drawing Sheets

METHOD OF CONTROLLING A CAMERA FOR USERS HAVING IMPAIRED VISION

BACKGROUND OF THE INVENTION

This application claims the priority of Korean Patent Application No. 2002-66123 filed on Oct. 29, 2002 in the Korean Intellectual Property Office, the disclosure of which is incorporated herein in its entirety by reference.

1. Field of the Invention

The present invention relates to a method of controlling a camera, and more particularly, to a camera method in which photographing control is performed according to the operation by a user when the user sets a photographing mode and setting control to set operation conditions to fit to oneself according to the manipulation by the user when the user sets a menu mode, and a method of controlling the same.

2. Description of the Related Art

In typical cameras, for example, digital cameras, since various functions are provided, the size of an on-screen display (OSD) menu decreases to display the functions on a small screen of a display panel. Since the size of the OSD menu is fixed in the typical cameras, it is very difficult for persons with impaired vision, the elderly, and the visually disabled to use the camera.

Referring to FIG. 1, U.S. Pat. No. 6,256,027 discloses a video display appliance which displays various states on a screen of a display panel DS using an OSD menu function. However, although OSD related techniques for video display appliances are applied to the typical cameras, since the size of the OSD menu cannot be adjusted, persons with impaired vision, the elderly, and visually impaired persons have difficulty using the cameras.

SUMMARY OF THE INVENTION

To solve the above and/or other problems, the present invention provides a method for manipulating a camera so that it can be easily used by persons with impaired vision, the elderly, and visually impaired persons, and a method of controlling the same.

According to another aspect of the present invention, a method of controlling a camera including a photographing control step of, when a photographing mode is set by the operation of a user, performing photographing control according to the operation of the user and, when a menu mode is set by the operation of the user, performing setting control for setting operation conditions of the camera according to the operation of the user, wherein, when a mode for persons with impaired vision is set by the operation of the user, an OSD menu selected by the user is magnified and displayed in the photographing control and setting control steps.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 2:
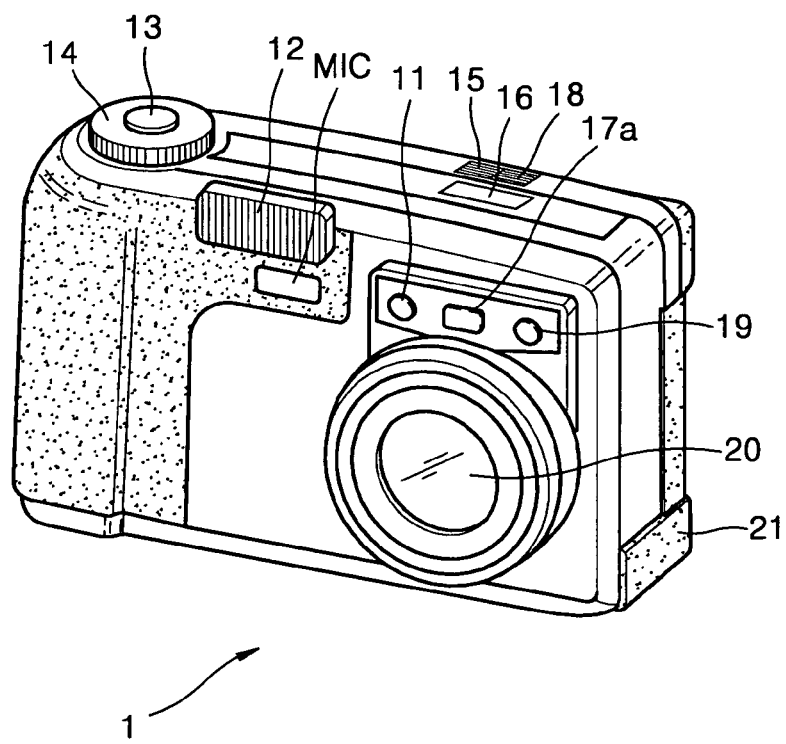
FIG. 2 is a perspective view illustrating the front-side appearance of a digital camera according to a preferred embodiment of the present invention.

Referring to FIG. 2, a microphone MIC, a self-timer lamp 11, a flash 12, a shutter button 13, a mode dial 14, a function selection button 15, a photographing information display portion 16, a viewfinder 17a, a function block button 18, a flash light amount sensor 19, a lens portion 20, and an external interface portion 21 are arranged on the front and upper surfaces of a digital camera 1 according to a preferred embodiment of the present invention.

The self-timer lamp 11, in self-timer mode, flickers during a set time from the time when the shutter button 13 is pressed to the time when a shutter operates. The mode dial 14 is used to select and set one of a variety of modes, including, for example, a still image photographing mode, a night view photographing mode, a motion picture photographing mode, a play mode, a computer connection mode, and a system setting mode. The function selection button 15 is used to select one of the operation modes of the digital camera 1, for example, the still image photographing mode, the night view photographing mode, the motion picture photographing mode, and the play mode. The photographing information display portion 16 displays information on each of the functions related to photographing. The function block button 18 allows the user to select each function displayed on the photographing information display portion 16.

Figure 3:
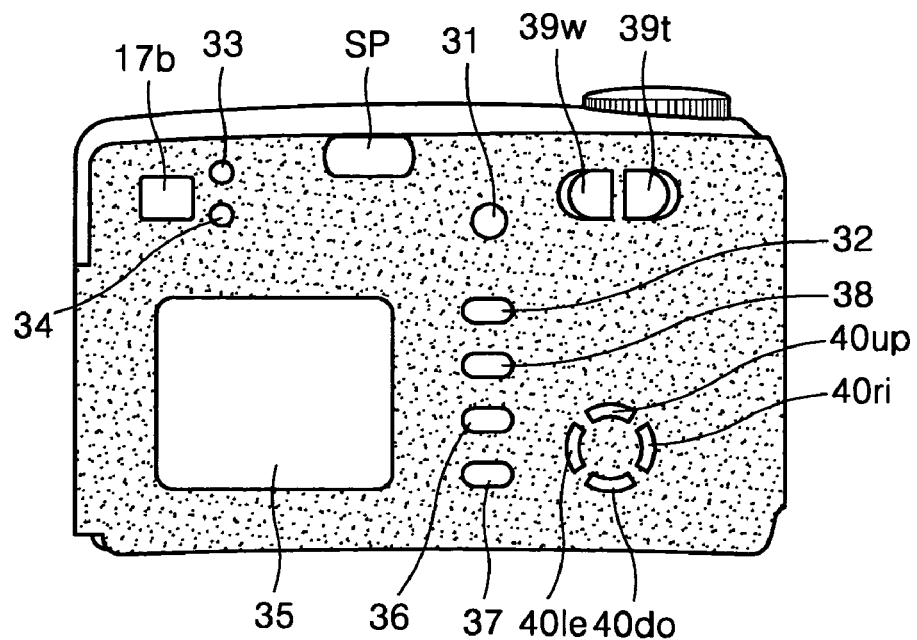
FIG. 3 is a view illustrating the rear-side appearance of the digital camera of FIG. 2.

FIG. 3 reveals a digital camera with a speaker SP, a power button 31, a monitor button 32, an automatic focus lamp 33, a viewfinder 17b, a flash ready lamp 34, a display panel 35, a confirm/cancel button 36, an enter/play button 37, a menu button 38, a wide-angle zoom button 39w, a telephoto zoom button 39*t*, an up movement button 40*up*, a right movement button 40*ri*, a down movement button 40*do*, and a left movement button 40*le*.

Figure 1:
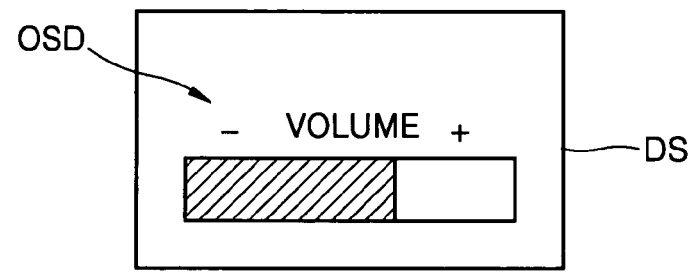
FIG. 1 is a view illustrating an OSD menu displayed on a display panel of a typical camera.

The monitor button 32 allows a user to control the operation of the display panel 35. For example, when the monitor button 32 is pressed once, an image of an object being photographed and photographing information are displayed on the display panel 35. When the monitor button 32 is pressed twice, only the image of an object being photographed is displayed on the display panel 35. When the monitor button 32 is pressed a third time, power applied to the display panel 35 is cut off. The automatic focus lamp 33 operates when an automatic focusing operation is completed. The flash ready lamp 34 operates when the flash 12 of FIG. 1 is in a ready mode. The confirm/cancel button 36 is used as a confirm button or a cancel button when the user sets each mode. The enter/play mode 37 is used for the user to input data or to set a stop or play function in a play mode. The menu button 38 is used to display a menu of a mode selected via the mode dial 14. The up movement button 40*up*, the right movement button 40*ri*, the down movement button 40*do*, and the left movement button 40*le* are used when the user sets each mode.

Figure 4:
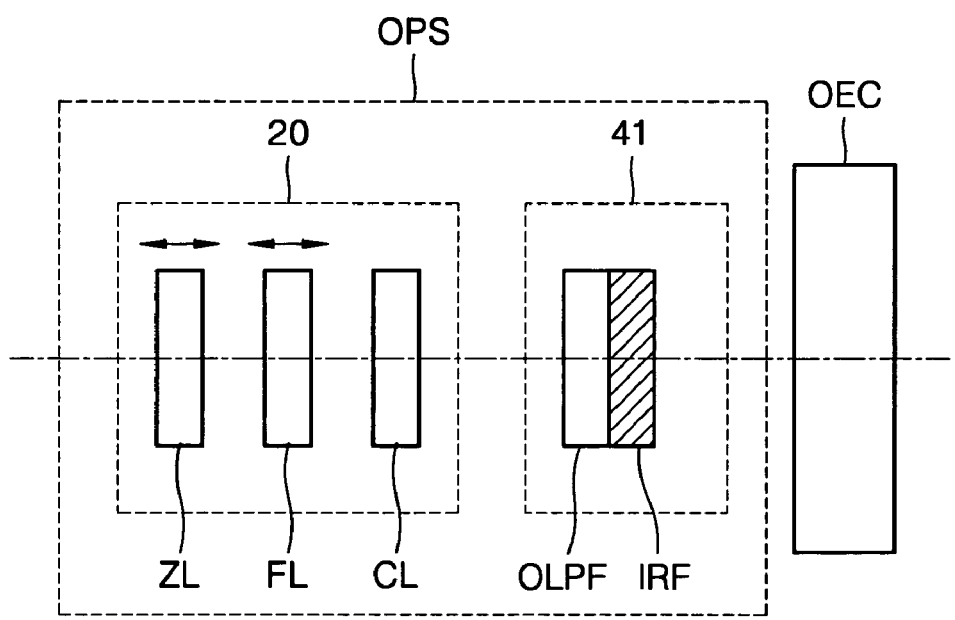
FIG. 4 is a view illustrating the configuration of the light incident side of the digital camera of FIG. 2.
Figure 5:
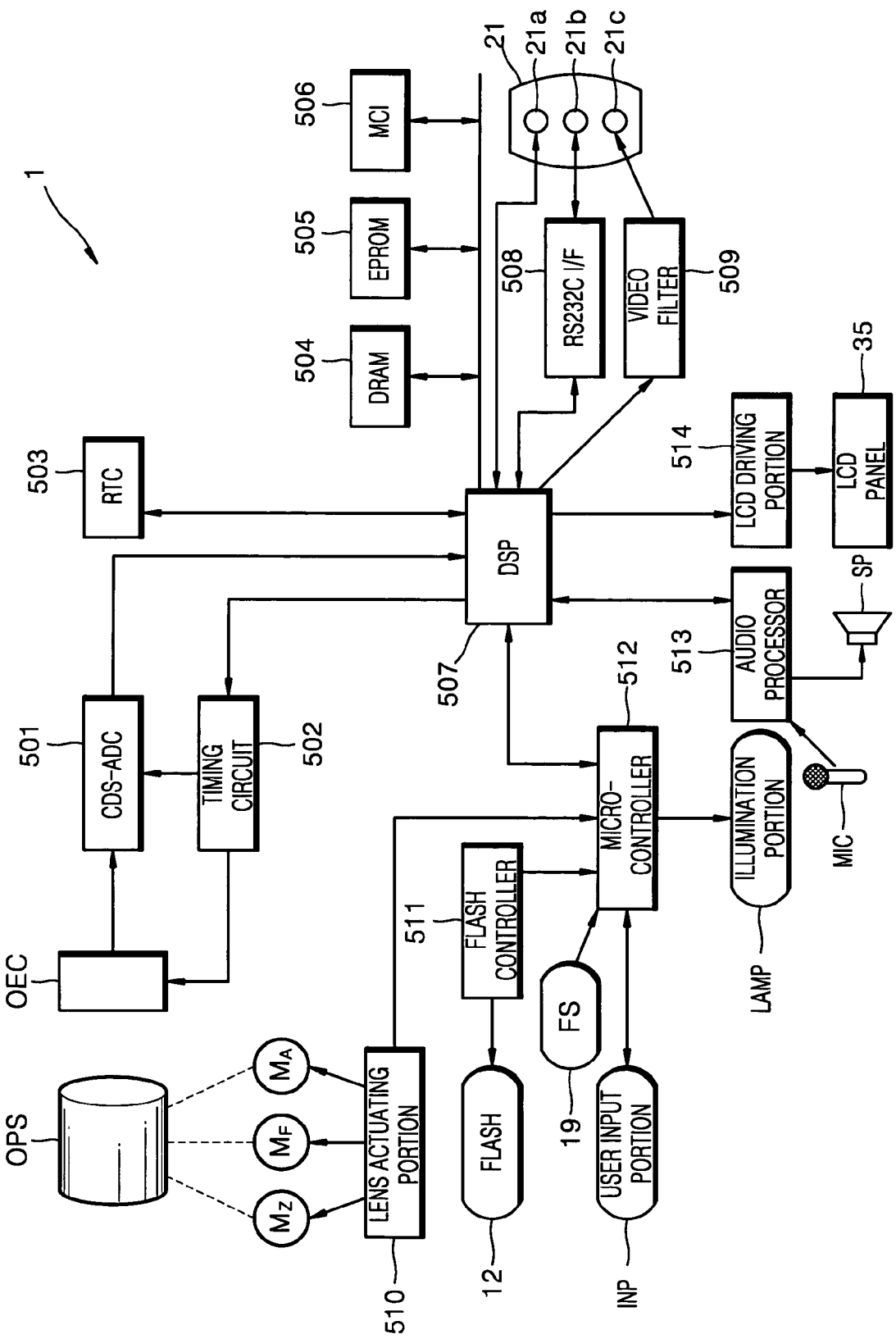
FIG. 5 is a block diagram illustrating the overall structure of the digital camera of FIG. 2.

FIG. 4 shows the configuration of the light incident side of the digital camera 1 of FIG. 2. FIG. 5 shows the overall structure of the digital camera 1 of FIG. 2. Referring to FIGS. 4 and 5, the overall structure of the digital camera 1 of FIG. 2 is described below.

An optical system OPS including the lens portion 20 and a filter portion 41 optically processes light from an object subject to photographing. The lens portion 20 of the optical system OPS includes a zoom lens ZL, a focus lens FL, and a compensation lens CL.

When the user presses the wide-angle zoom button 39w of FIG. 4 or the telephoto zoom button 39*t* of FIG. 4 included in a user input portion INP, a signal corresponding to the pressed button is input to a microcontroller 512. Accordingly, as the microcontroller 512 controls a lens actuating portion 510, a zoom motor $M_z$ is actuated to move the zoom lens ZL.

That is, when the wide-angle zoom button 39*w* of FIG. 4 is pressed, a focal length of the zoom lens ZL decreases so that an angle of view increases. When the telephoto zoom button 39*t* of FIG. 4 is pressed, the focal length of the zoom lens ZL increases so that an angle of view decreases. According to the above characteristic, the microcontroller 512 obtains an angle of view with respect to the position of the zoom lens ZL from design data of the optical system OPS. Since the position of the focus lens FL is adjusted in a state in which the position of the zoom lens ZL is set, the angle of view is barely affected by the position of the focus lens FL.

When focusing is automatically or manually performed with respect to the object, the present position of the focus lens FL varies according to the present position of the object. In an automatic focusing mode, the microcontroller 512 controls the lens actuating portion 510 so that the focus motor $M_F$ is actuated. Accordingly, the focus lens FL moves between one end and the opposite end. During the movement, the position of the focus lens FL, which may be an incremental position, or position step number, of the focus motor $M_F$, is set at the point where the largest amount of a high frequency included in an image signal is measured.

The compensation lens CL is not separately actuated since it has the function of compensating for the overall refractive index.

Reference numeral $M_A$ denotes a motor for actuating an aperture (not shown). Here, a rotation angle of the aperture actuating motor $M_A$ varies according to whether a designated exposure mode is on or not. The designated exposure mode is a mode to set the amount of exposure of the digital camera with respect to an average brightness of a designated detection area indicated on the display panel 35 of the digital camera when part of an area that a user desires is in an area being photographed matches the designated detection area.

The filter portion 41 of the optical system OPS includes an optical low pass filter OLPF which removes optical noise of a high frequency and an infrared cut filter IRF which cuts an infrared component of the incident light.

An optoelectric converting portion OEC of a CCD (charge coupled device) or a CMOS (complementary metal-oxide-semiconductor) converts light from the optical system OPS to an electric analog signal. A digital signal processor DSP 507 controls the operation of the optoelectric converting portion OEC and a CDS-ADC (correlation double sampler and analog-to-digital converter) device 501 as an analog-to-digital converting portion by controlling a timing circuit 502. The CDS-ADC device 501 processes the analog signal from the optoelectric converting portion OEC by removing high frequency noise and adjusting the amplitude thereof, to convert the processed analog signal to a digital signal. The digital signal processor DSP 507 processes the digital signal from the CDS-ADC device 501 to generate a digital image signal divided into a brightness signal and a chrominance signal.

An illumination portion LAMP operated by the microcontroller 512 includes the self-timer lamp 11 of FIG.1, the automatic focusing lamp 33 of FIG. 4, and the flash ready lamp (34 of FIG. 4). The user input portion INP includes the shutter button 13 of FIG. 3, the mode dial 14 of FIG. 4, the function selection button 15 of FIG. 3, the function block button 18 of the FIG. 3, the monitor button 32 of FIG. 4, the confirm/delete button 36 of FIG. 4, the enter/play button 37 of FIG. 4, the menu button 38 of FIG. 4, the wide-angle zoom button 39*w* of FIG. 4, the telephoto zoom button 39*t* of FIG. 4, the up movement button 40*up* of FIG. 4, the right movement button 40*ri* of FIG. 4, the down movement button 40*do* of FIG. 4, and the left movement button 40*le* of FIG. 4.

The digital image signal from the digital signal processor DSP 507 is temporarily stored in the DRAM (dynamic random access memory) 504. An EEPROM (electrically erasable programmable read only memory) 505 contains algorithm and set data needed for the operation of the digital signal processor DSP 507. A user's memory card may be detachably inserted in a memory card interface MCI 506.

The digital image signal from the digital signal processor DSP 507 is input to an LCD driving portion 514 so that an image is displayed on the display panel 35.

The digital image signal from the digital signal processor 507 can be transmitted in a series communication through a USB (universal serial bus) connection portion 21*a*, or an RS232C interface 508 and a connection portion 21*b*. The digital image signal can be transmitted as a video signal through a video filter 509 and a video output portion 21*c*.

An audio processor 513 outputs a voice signal from the microphone MIC to the digital signal processor DSP 507 or a speaker SP and an audio signal from the digital signal processor 507 to the speaker SP.

The microcontroller 512 drives the flash 12 *b* controlling the operation of the flash controller 511 according to a signal from the flash light amount sensor 19. Also, the microcontroller 512 executes algorithm of the present invention which is described later.

Figure 6:
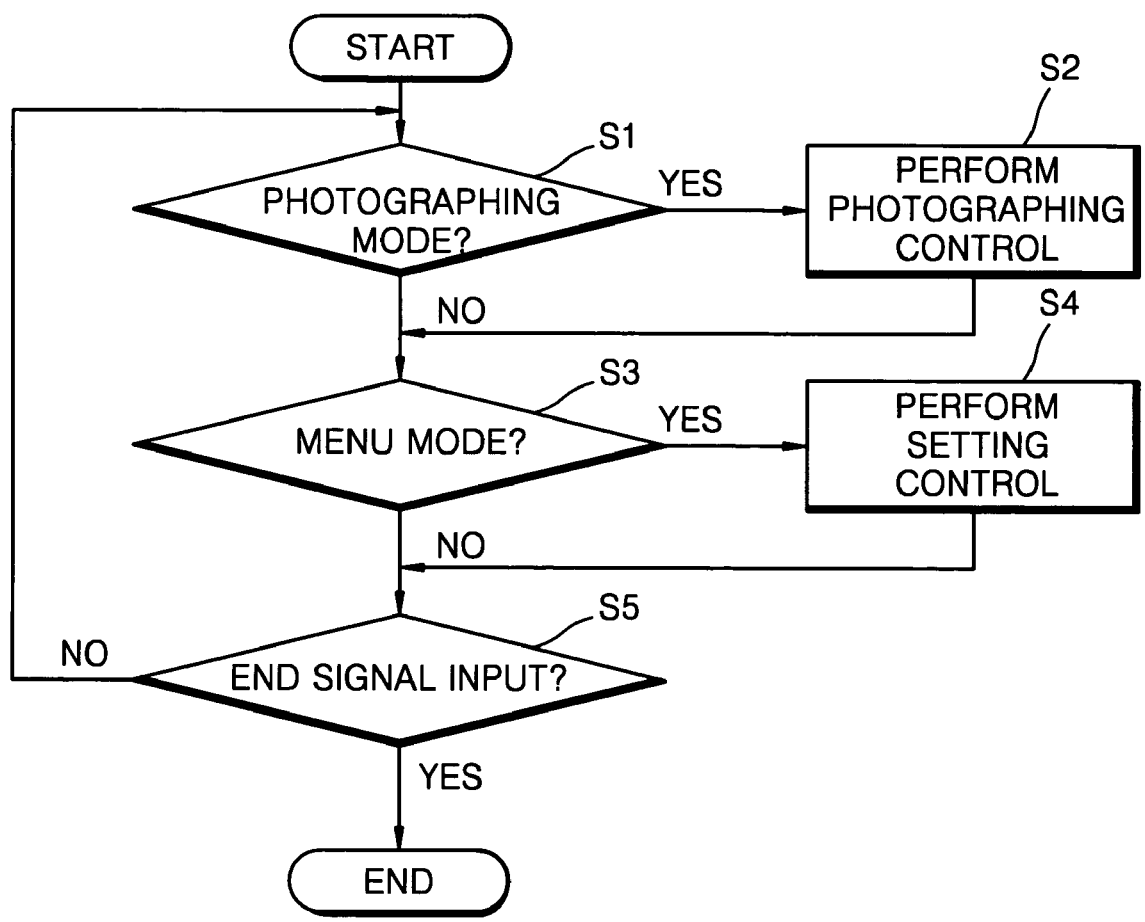
FIG. 6 is a flow chart for explaining the overall control algorithm of the microcontroller of FIG. 5.

Referring to FIG. 6, the microcontroller 512 of FIG. 5 performs photographing control when a photographing mode is set by the user (Steps S1 and S2). When a menu mode is set by the user, the microcontroller 512 performs a setting control step in which conditions of the operation of a camera are set by the user (Step S3 and S4). The above steps are repeated until an external end signal is input (Step S5).

Figure 7:
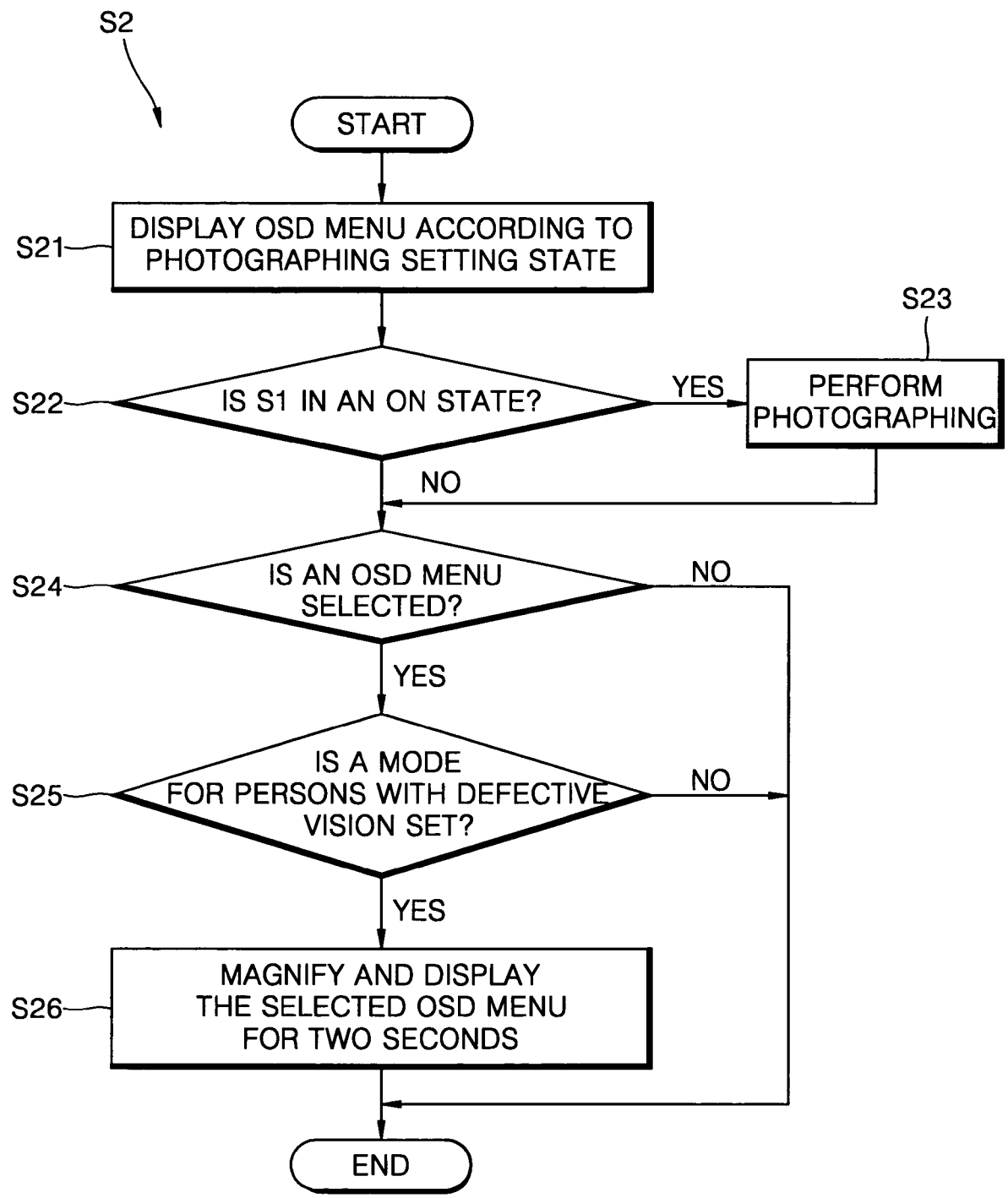
FIG. 7 is a flow chart for explaining the algorithm of the photographing control step S2 shown in FIG. 6.

Referring to FIG. 7, algorithm of the photographing control step (S2) of FIG. 6 is described below.

Figure 8A:
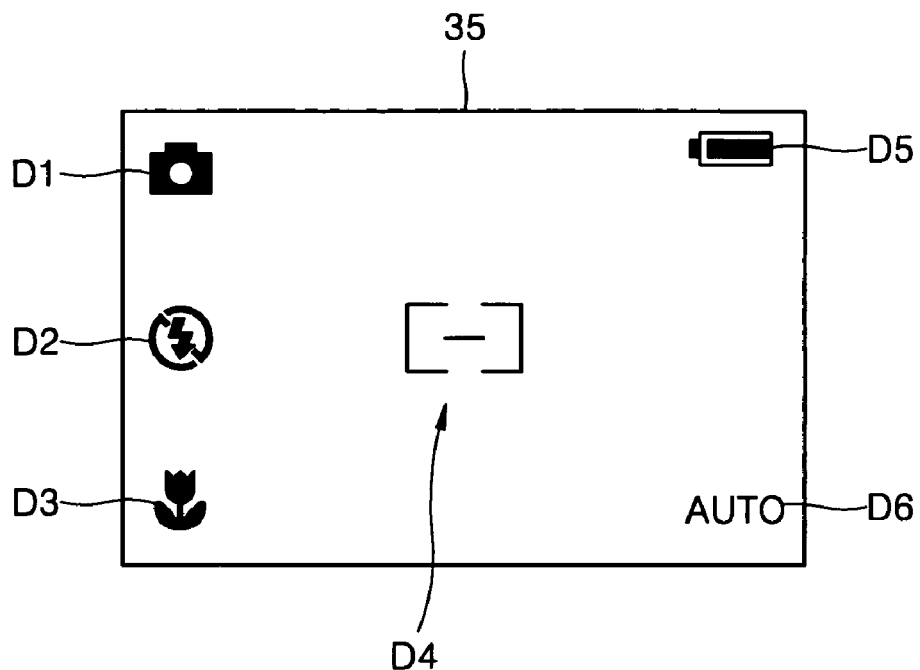
FIG. 8A is a view illustrating the first example of the image displayed on the display panel according to the execution of the step S21 of FIG. 7.
Figure 9A:
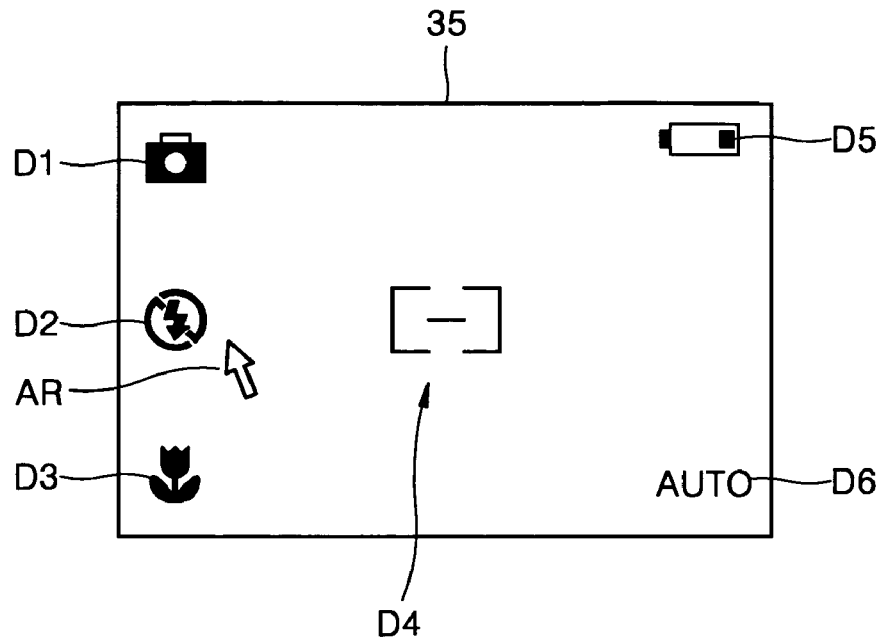
FIG. 9A is a view illustrating the second example of the image displayed on the display panel according to the execution of the step S21 of FIG. 7.

First, an OSD menu related to a photographing setting state is displayed (refer to Step S21 and FIGS. 8A and 9A). Next, when a first step signal S1 is not generated (Step S22), the steps S24 through 26 are performed. When the first step signal S1 is generated by a user pressing the shutter button 13 of FIG. 2 (Step S22), the steps S24 through S26 are performed after the performance of photographing operation control (Step S23).

When a particular OSD menu is selected by the user (Step S24), it is checked whether a mode for a person with impaired vision is set by the user (Step S25). When the mode for a person with impaired vision is set, the selected OSD menu is magnified and displayed for a moment, for example, two seconds, (refer to Step S26 and FIGS. 8B, 8C, and 9B). That is, the OSD menu selected by the user is magnified for two seconds and then returned to its original size.

FIG. 8A shows the first example of a screen displayed on the display panel 35 of FIGS. 3 and 5 according to the execution of Step S21 of FIG. 7. Referring to FIG. 8A, an operation mode OSD menu D1, a flash OSD menu D2, a focusing OSD menu D3, a focusing mark OSC menu D4, a charge state OSD menu D5, and a white balance mode OSD D6 are displayed. The operation mode OSD menu D1 shows a mode set by a user using the mode dial 14 of FIG. 2, a still image photographing mode in the example shown. The flash OSD menu D2 shows a flash mode set by the user, an illuminating prevention mode in the present example. The focusing mode OSD menu D3 shows a focusing mode set by the user, that is, an automatic focusing mode in the present example. The focusing mark OSD menu D4 shows the present focusing state. The charge state OSD menu D5 shows the charge state of a power supply battery. The white balance mode OSD D6 shows a selected white balance mode, an automatic focusing mode in the present example.

Figure 8B:
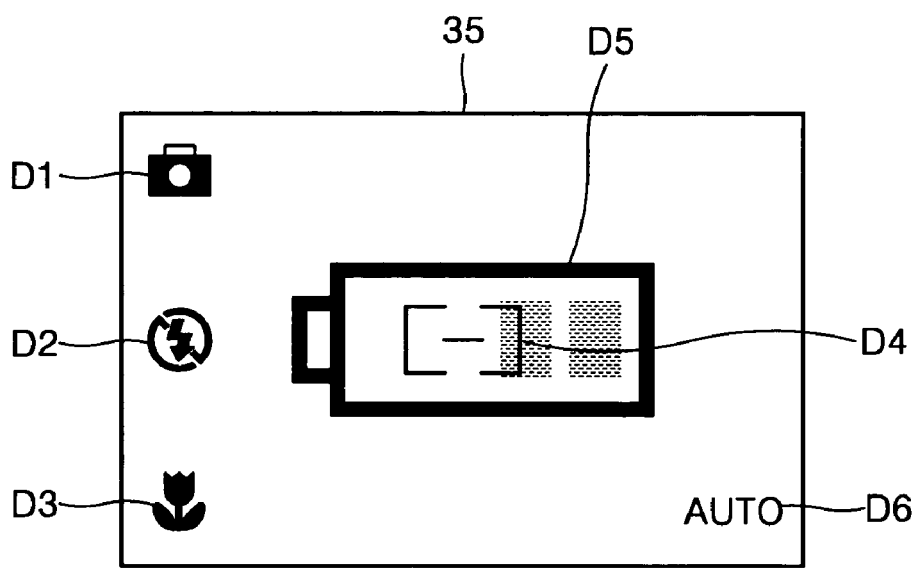
FIG. 8B is a view illustrating the first example of the image displayed on the display panel according to the execution of the step S26 of FIG. 7.

FIG. 8B shows the first example of a screen displayed on the display panel 35 of FIGS. 3 and 5 according to the execution of Step S26 of FIG. 7. In FIG. 8B, the same reference numerals as those in FIG. 8A indicate the same elements having the same functions. Referring to FIG. 8B, when a mode for a person with impaired vision is set, the selected OSD menu D5 is magnified and displayed for a predetermined time, for example, two seconds. This magnification display time can be changed by the user. As a result, persons with impaired vision, the elderly, and the visually disabled can easily use the digital camera.

Figure 8C:
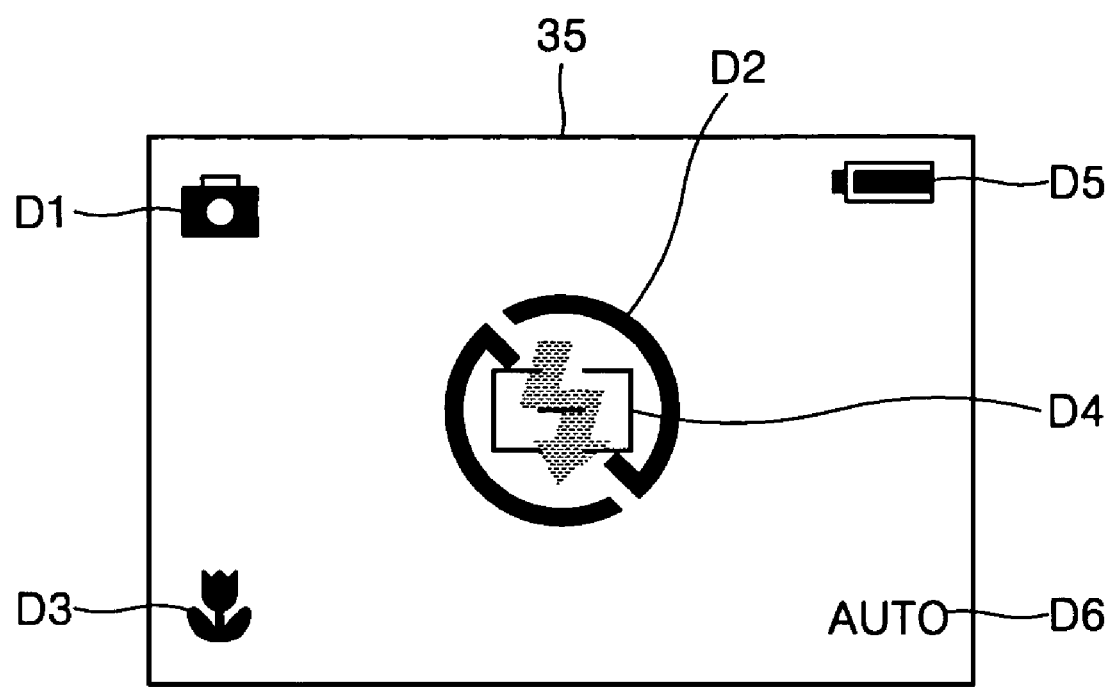
FIG. 8C is a view illustrating the second example of the image displayed on the display panel according to the execution of the step S26 of FIG. 7.

FIG. 8C shows the second example of a screen displayed on the display panel 35 of FIGS. 3 and 5 according to the execution of Step S26 of FIG. 7. In FIG. 8C, the same reference numerals as those in FIG. 8A indicate the same elements having the same functions. Referring to FIG. 8C, when the mode for a person with impaired vision is set, the selected OSD menu D2 is magnified and displayed for a predetermined time, for example, two seconds. As a result, persons with impaired vision, the elderly, and the visually disabled can easily use the digital camera.

FIG. 9A shows another example of the screen displayed on the display panel 35 of FIGS. 3 and 5 according to the execution of Step S21 of FIG. 7. In FIG. 9A, the same reference numerals as those in FIG. 8A indicate the same elements having the same functions. An arrow AR for guiding the selection of a user is additionally displayed, as compared to the embodiment from FIG. 8A. The OSD menu selected by the arrow AR is magnified and displayed for a predetermined time, for example, two seconds, as shown in FIG. 9B.

Figure 9B:
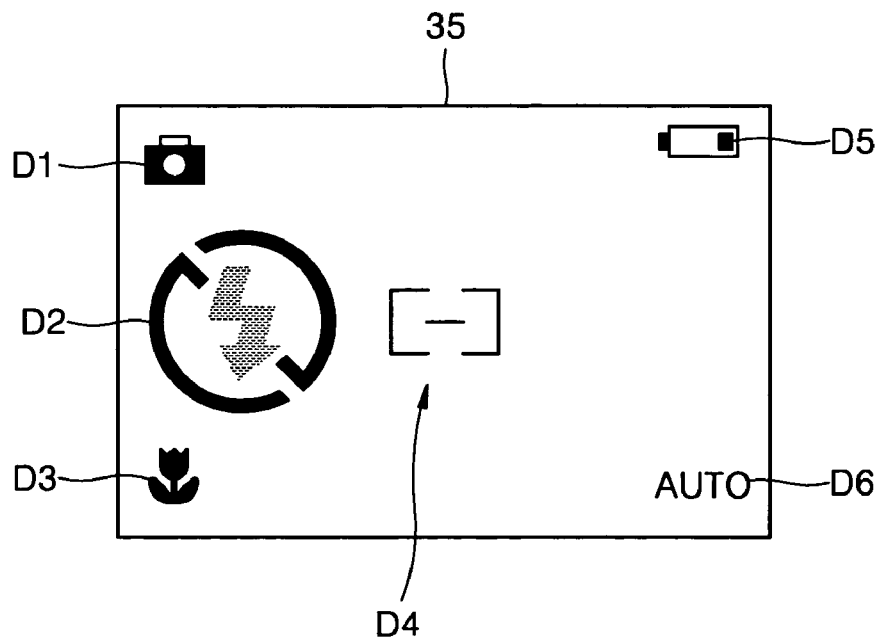
FIG. 9B is a view illustrating the third example of the image displayed on the display panel according to the execution of the step S26 of FIG. 7.
Figure 10A:
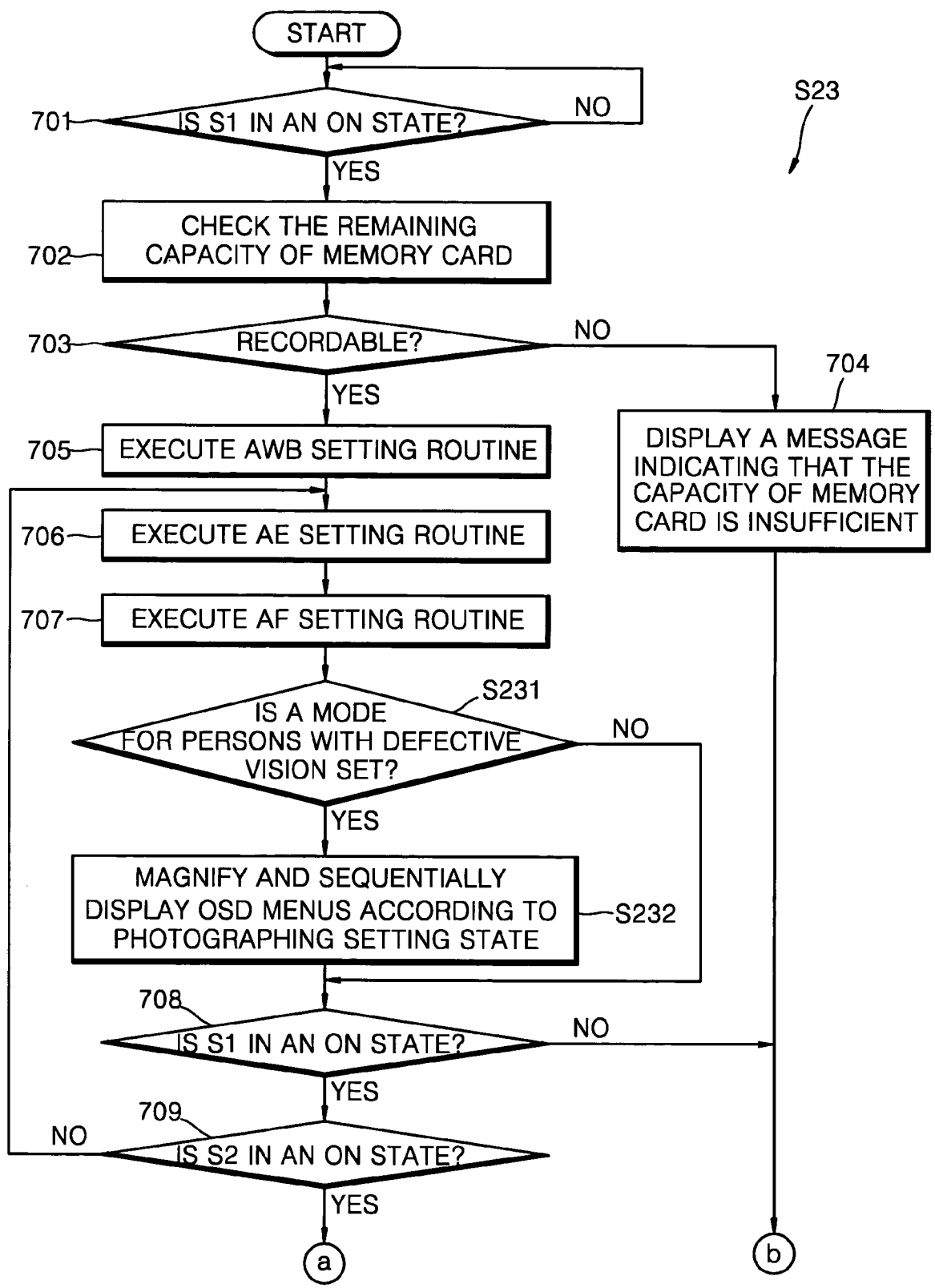
FIGS. 10A and 10B are flow charts for explaining the algorithm of the photographing operation step S23 of FIG. 7.
Figure 10B:
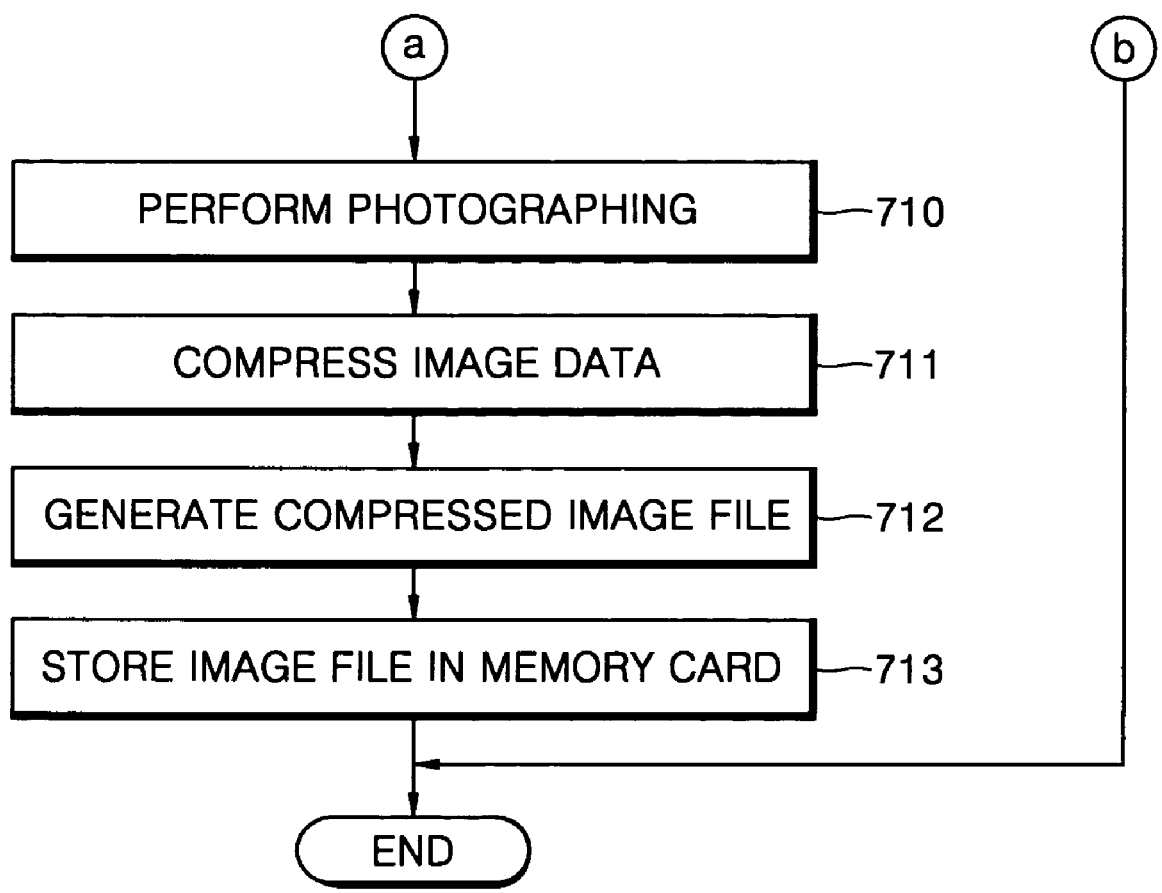

FIG. 9B shows the screen displayed on the display panel 35 of FIGS. 3 and 5 according to the execution of Step S26 of FIG. 7 after selection via the arrow by a user. In FIG. 9B, the same reference numerals as those in FIG. 8A indicate the same elements having the same functions. Referring to FIG. 9B, in the mode for a person with impaired vision, the arrow-selected OSD menu D2 is magnified and displayed for a predetermined time, for example, two seconds. As a result, persons with defective vision, the elders, and the visually disabled can easily use the digital camera.

Referring to FIGS. 2 through 5, 10A, and 10B, the algorithm of the photographing operation step S23 of FIG. 7 is described as follows. As described above, the shutter button 13 included in the user input portion INP has a two-step structure. When a user presses the shutter button 13 to a first step (after operating the wide-angle zoom button 39w and the telephoto zoom button 39t) a signal S1 from the shutter button 13 is in an ON state. When the user presses the shutter button 13 to a second step, a second step signal S2 from the shutter button 13 is in an ON state. The photographing algorithm of FIG. 5 starts when the user presses the shutter button 13 to the first step (Step 701). Here, the present position of the zoom lens ZL is already set.

First, the remaining capacity of a memory card is checked (Step 702) to confirm whether the capacity is sufficient for recording digital image signals (Step 703). If the capacity is not sufficient for recording, a message indicating the capacity of the memory card is not sufficient is displayed (Step 704). If the capacity is sufficient for recording, the following steps are executed.

First, an automatic white balance (AWB) mode is executed so that relevant parameters are set (Step 705). An automatic exposure (AE) mode is executed so that the amount of exposure to incident brightness is calculated. The aperture actuating motor $M_A$ is actuated according to the calculated exposure amount (Step 706). An automatic focusing (AF) mode is executed so that the present position of the focus lens FL is set (Step 707).

When it is confirmed that a mode for a person with impaired vision has been selected by the user (Step S231), the OSD menus corresponding to the photographing setting states are sequentially magnified and displayed (Step S232). Accordingly, persons with impaired vision, the elderly, and the visually disabled can conveniently use a camera.

Next, it is checked whether the first step signal S1 from the shutter button 113 is in an ON state (Step 708). If the first step signal S1 is not in the ON state, this indicates that the user has no immediate intention to take a photograph, and the program is terminated. If the first step signal S1 is in the ON state, the following steps are executed.

First, whether the second step signal S2 is in an ON state is determined (Step 709). If the second step signal S2 is not in a ON state, this indicates that the user has not pressed the shutter button 13 to the second step to take a photograph, and the program goes back to Step 706.

If the second step signal S2 is in the ON state, this means that the user has pressed the shutter button 13 to the second step to take a photograph, and a photographing operation is executed (Step 710). That is, the digital signal processor DSP 507 is operated by a microcontroller 512 so that the optoelectric converting portion OEC and the CDS-ADC device 501 are operated by the timing circuit 502. Then, image data is compressed (Step 711) and a compressed image file is generated (Step 712). The generated image file is transferred through the memory card interface 506 from the digital signal processor DSP 507 (Step 713) and stored in a memory card. Then the algorithm is terminated.

Figure 11:
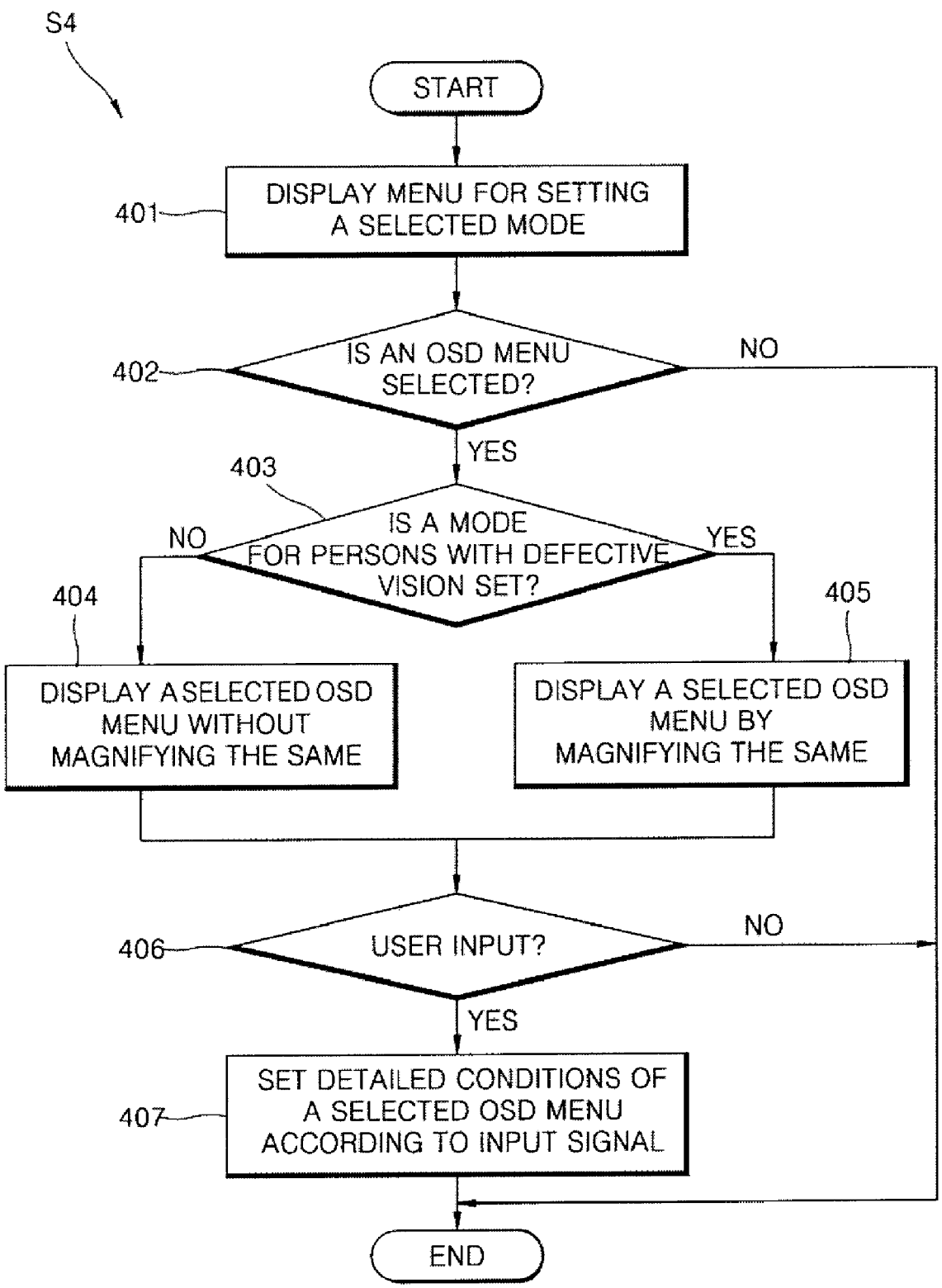
FIG. 11 is a flow chart for explaining the algorithm of the setting control step S4 of FIG. 6.
Figure 12A:
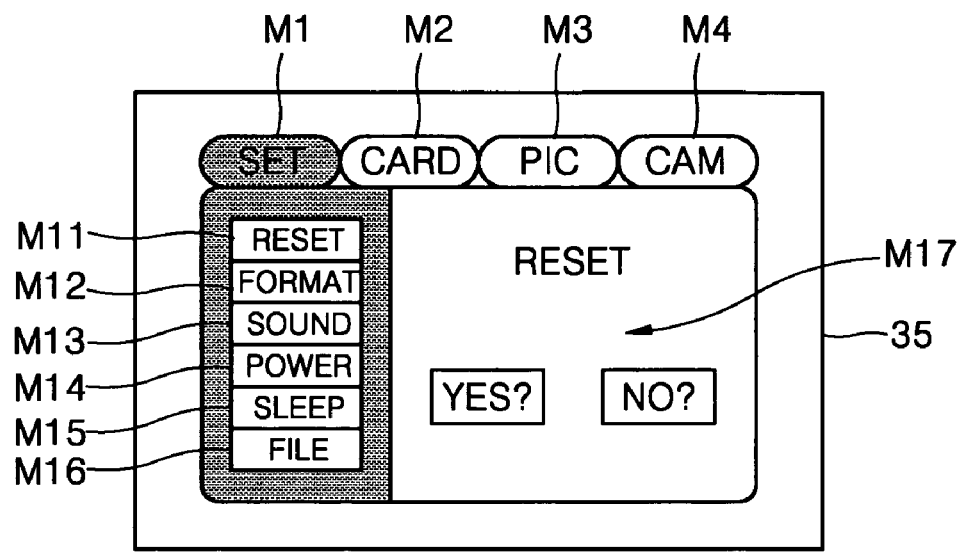
FIG. 12A is a view illustrating an example of the image displayed on the display panel according to the execution of the step 404 of FIG. 11.
Figure 12B:
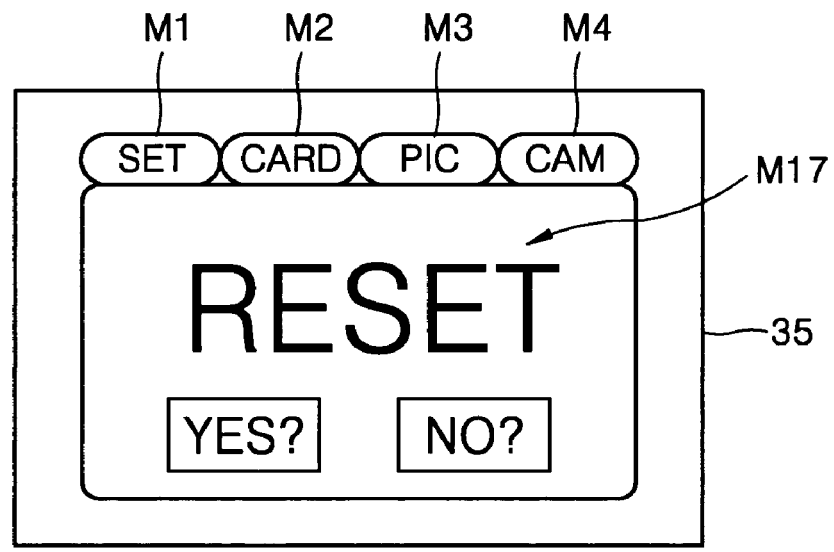
FIG. 12B is a view illustrating an example of the image displayed on the display panel according to the execution of the step 405 of FIG. 11.

FIG. 11 shows the algorithm for the setting control step S4 of FIG. 6. The setting control step S4 begins when a user operates the menu button 38 after selecting a system setting mode by operating the mode dial 14 of FIG. 2. FIG. 12A shows an example of an image displayed on the display panel (35 of FIGS. 3 and 5) according to the execution of the step 404 of FIG. 11. FIG. 12B shows an example of an image displayed on the display panel 35 according to the execution of the step 405 of FIG. 11.

Referring to FIGS. 11 through 12B, the algorithm of the setting control step S4 of FIG. 6 is described below.

First, a menu for setting a selected mode is displayed (Step 401). A basic setting OSD menu M1, a memory card setting OSD menu M2, a picture setting OSD menu M3, and a photographing setting OSD menu M4 are displayed as a main menu. A detailed menu M11 through M16 of an OSD menu selected from the main menu is displayed. The basic setting OSD menu M1 indicates basic settings of a digital camera. The memory card setting OSD menu M2 indicate settings of a memory card. The picture setting OSD menu M3 indicates conditions of a picture to be obtained during photographing. The photographing setting OSD menu M4 indicates various conditions related to photographing, for example, conditions of exposure, focusing, and white balance operations.

The detailed menus M11 through M16 of the basic setting OSD menu M1 selected from the main menu includes a reset OSD menu M11, a memory card format OSD menu M12, an output sound setting OSD menu M13, a power control OSD menu M14, a sleep mode setting OSD menu M15, and a file setting OSD menu M16. The reset OSD menu M11 indicates resetting all settings of a digital camera to the default settings set in a manufacturing process. The memory card format OSD menu M12 indicates formatting of a memory card. The output sound setting OSD menu M13 indicates setting of conditions of output sound. The power control OSD menu M14 indicates adjustment of power consumption of the digital camera and is selected when a low power mode or an automatic power-cut mode is set. The sleep mode setting OSD menu M15 indicates control conditions when the digital camera is not operated while being turned on for a long time. The file setting OSD menu M16 indicates various conditions of files to be formed in the memory card.

When a menu for setting a selected mode is displayed and an OSD menu is selected (Step 402), it is determined whether a mode for persons with impaired vision has been set by a user (Step 403).

If the mode for persons with defective vision is not set, the selected OSD menu M17 is displayed without being magnified (Step 404; refer to FIG. 12A). In contrast, if the mode for persons with defective vision is set, the selected OSD menu M17 is magnified and displayed (Step 405; refer to FIG. 12B). Accordingly, the persons with defective vision, the elders, and the visually disabled can conveniently use a camera.

Next, when a setting signal is input by the user with respect to the displayed menu (Step 406), detailed conditions of the selected OSD menu are set according to the input signal (Step 407).

The above steps can be repeated as the overall control algorithm of FIG. 6 is repeatedly performed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for altering a digital camera display to facilitate viewability, the method comprising the steps of:
    displaying indicia on a display screen of the digital camera, the indicia including a first indicium and a second indicium;
    detecting selection of the first indicium by a user;
    if selection of the first indicium by a user is detected, determining whether an impaired vision mode is set;
    if an impaired vision mode is determined to be set, performing steps of:
        superimposing the first indicium on the second indicium;
        magnifying the first indicium to conceal an entirety of the second indicium; and
        reducing an opacity of the first indicium so that the entirety of the second indicium is viewable through the first indicium.

2. The method of claim 1 flirt her comprising:
    if a predetermined set time has elapsed after the reducing step, displaying the first indicium in a position the indicium occupied prior to the superimposing;
    increasing the opacity of the first indicium to an opacity the indicium had prior to the reducing step; and
    returning the first indicium to a pre-superimposing step size.

3. The method of claim 2 wherein the predetermined set time is determined by the user.

4. The method of claim 1 wherein the detecting step comprises:
    detecting whether a user has actuated a movement button; and
    if the user has actuated a movement button, detecting whether a marker that is movable relative to the movement button is positioned on the first indicium.

5. The method of claim 1 wherein the magnifying step comprises enlarging a size of the first indicium to occupy a substantially entire area of the display screen.

6. The method of claim 1 wherein the displaying step further comprises:
    displaying the first indicium in a first portion of the display screen; and
    displaying the second indicium in a second portion of the display screen, the second portion being different than the first portion.

7. The method of claim 6 wherein the superimposing step comprises:
    deleting the first indicium from the first portion;
    substantially simultaneously with the deleting step, displaying the first indicium in the second portion; and
    maintaining the second indicium in the second portion.

8. A method for altering a digital camera display to facilitate readability, the method comprising the steps of:
    displaying a menu on a display screen of the digital camera, the menu including a first menu item and a second menu item;
    detecting whether a user has selected one of the first menu item and the second menu item;
    if selection of one of the first menu item and the second menu item is detected in the detecting step, determining whether an impaired vision mode is set;
    if an impaired vision mode is determined to be set in the determining step, performing steps of:
        concealing an entirety of the other one of the first menu item and the second menu item with a magnified version of the selected one of the first menu item and the second menu item; and reducing an opacity of the magnified version of the selected one of the first menu item and the second menu item so that the entirety of the other one of the first menu item and the second menu item is viewable.

9. The method of claim 8 further comprising:
if a predetermined set time has elapsed after the reducing step, increasing the opacity of the magnified selected one of the first menu item and the second menu item; and
substantially simultaneously with the increasing step, returning the magnified selected one of the first menu item and the second menu item to a pre-concealing step size.

10. The method of claim 9 wherein the predetermined set time is determined by the user.

11. The method of claim 8 wherein step of detecting whether a user has selected one of the first menu item and the second menu item comprises determining whether the user has maneuvered a marker over the first or second menu item.

12. The method of claim 11 wherein the marker is an arrow.

13. A method for altering a digital camera display to facilitate readability, the method comprising the steps of:
displaying a first icon on a first portion of a display screen of the digital camera;
displaying a second icon on a second portion of the display screen of the digital camera, the second portion being distal from the first portion;
detecting selection of the first icon by a user;
if selection of the first icon is detected, determining whether an impaired vision mode is set;
if the impaired vision mode is determined to be set, performing the steps of:
moving the first icon from the first portion to a location proximate to the second portion;
magnifying the first icon to completely overlap the second icon; and
reducing an opacity of the first icon so that an entirely of the second icon is viewable through the first icon.

14. The method of claim 13 further comprising:
if a predetermined set time has elapsed after the reducing step, moving the first icon back to the first portion;
increasing the opacity of the first icon to a pre-reducing step opacity; and
returning the first icon to a pre-magnifying step size.

15. The method of claim 14 wherein the predetermined set time is determined by the user.

16. The method of claim 13 wherein the detecting step comprises:
detecting whether a user has actuated a movement button; and
if the user has actuated a movement button, detecting whether a marker that is movable relative to the movement button is positioned on the first icon.

17. The method of claim 13 wherein the magnifying step comprises enlarging a size of the first icon to occupy a substantially entire area of the display screen.

18. The method of claim 13 wherein the moving step comprises:
deleting the first icon from the first portion;
substantially simultaneously with the deleting step, displaying the first icon in the second portion; and
maintaining the second icon in the second portion.

* * * * *